Sept. 26, 1950 W. W. HANSEN ET AL Re. 23,271
ULTRA HIGH FREQUENCY CIRCUIT AND METHOD
Original Filed Aug. 21, 1943
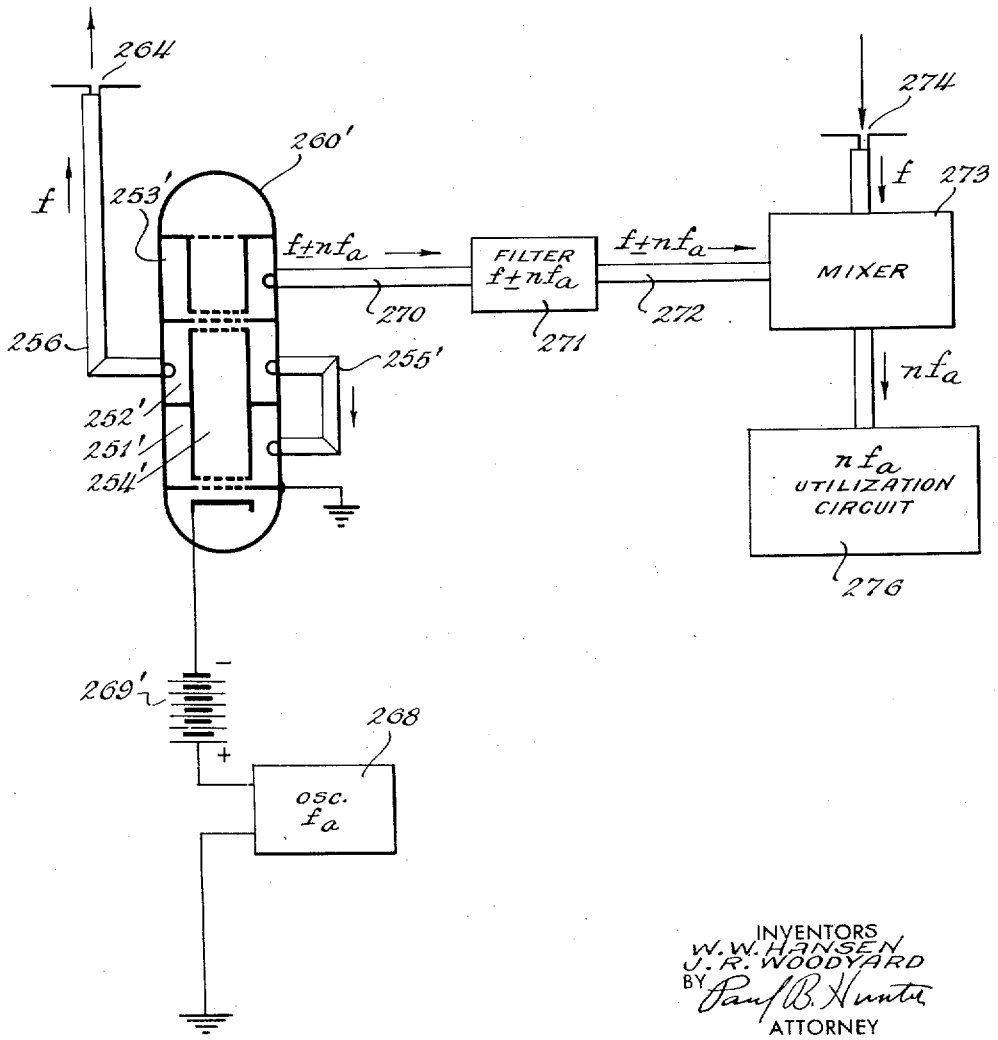
INVENTORS
W. W. HANSEN
J. R. WOODYARD
BY Paul B. Hunter
ATTORNEY Reissued Sept. 26, 1950

Re. 23,271

UNITED STATES PATENT OFFICE 23,271

ULTRA HIGH FREQUENCY CIRCUIT AND METHOD

William W. Hansen, deceased, late of Stanford University, Calif., by The Sperry Corporation, Great Neck, N. Y., assignee, and John R. Woodyard, Berkeley, Calif.

Original No. 2,452,566, dated November 2, 1948, Serial No. 569,516, December 23, 1944, which is a division of Serial No. 499,562, August 21, 1943. Application for reissue October 12, 1949, Serial No. 121,011

8 Claims. (Cl. 343—12)

Matter enclosed in heavy brackets [ ] appears in the original patent but forms no part of this reissue specification; matter printed in italics indicates the additions made by reissue

The present invention is related to the art including ultra-high-frequency object-detecting and locating systems and is more specifically directed to systems of the type wherein an ultra-high-frequency wave is radiated toward an object to be located and the reflected energy is received and used to supply the desired indications. The present application is a true divisional of our application Serial No. 499,562, filed August 21, 1943, *now Patent No. 2,519,369, granted August 22, 1950,* which itself is a continuation-in-part of prior copending application Serial No. 426,986, filed January 16, 1942, in the names of William W. Hansen, Russell H. Varian, John R. Woodyard, and Edward L. Ginzton, *now Patent No. 2,468,751, granted May 3, 1949.*

In systems of the present type difficulty has been experienced in securing stable reception, since the transmitting frequency may vary or drift considerably during operation for any of a number of causes, such as change in supply voltage, thermal drift, vibration, and other effects. To receive signals from a transmitter whose frequency thus tends to drift, it was formerly necessary to employ a receiver having a wide frequency band width to allow for drift. Such receivers are subject to the disadvantage of resulting unfavorable signal-to-noise ratio due to the increased band width. A further disadvantage resides in the greater number of amplification stages required, since the gain per stage decreases with increasing band width. In superheterodyne receivers further disadvantage resides in the necessity for using a local oscillator, which may also be subject to drift from similar causes.

To overcome these defects, in the present system a wave is derived differing in frequency from the transmitted frequency by a fixed and predetermined amount. This wave is then utilized as a local oscillator frequency in a superheterodyne receiver so that the resulting intermediate frequency will be fixed and predetermined no matter what variation in transmitter frequency occurs. In this manner the transmitter frequency and local oscillator frequency are continuously maintained in the correct relation with one another, avoiding the above-enumerated difficulties of the prior art and permitting the use of relatively sharply tuned intermediate frequency circuits resulting in greatly improved operation.

According to the present invention, a single velocity-modulation oscillator-buffer tube of the type disclosed in U. S. Patent No. 2,294,942, issued September 8, 1942, in the name of R. H. Varian et al., is utilized to simultaneously generate a high-power ultra-high-frequency wave suitable for transmission and a local oscillator wave separated in frequency therefrom by the desired fixed intermediate frequency. Such a device comprises three cavity resonators successively traversed by an electron stream. The first cavity resonator serves to velocity modulate the electrons of the stream at a predetermined frequency to which the resonator is substantially tuned. These velocity-modulated electrons thereafter traverse a field-free drift space in which they become velocity-grouped or density-modulated. The density-modulated stream then enters the second cavity resonator which extracts energy of the velocity-modulating frequency from the stream. Part of this extracted energy is fed back to the first resonator to sustain oscillations in the device. This portion of the system provides a self-oscillating ultra-high-frequency generator, and energy of this ultra-high frequency may be extracted from the second resonator for use in transmission. The electron stream is further controlled at a frequency equal to the desired intermediate frequency of the receiving system or a sub-multiple thereof. As a result of this modulation, the electron beam contains alternating current components of frequencies corresponding to the modulation side-bands of the transmitted wave as modulated by the modulating frequency. Energy at any one of these side frequencies suitable for use as the local oscillator wave may then be derived from the third cavity resonator by tuning this cavity resonator to this local oscillator frequency.

Accordingly, it is an object of the present invention to provide improved synchronized radio transmission and reception apparatus of the superheterodyne type operating at a fixed intermediate frequency independent of the transmitted or received frequency.

It is another object of the present invention to provide improved apparatus at ultra high frequencies adapted to produce two ultra high frequency waves having frequency separations of desired amounts, independent of variation or drift of the ultra-high-frequency waves.

It is a further object of the present invention to provide improved apparatus for shifting a predetermined frequency by a desired amount.

Other objects and advantages of the present invention will become apparent from the specification, taken in connection with the accompanying drawings, wherein the single figure of the drawing shows a schematic wiring diagram of the present invention.

In this figure is shown an oscillator-buffer device 260′ of the velocity-modulation type described more in detail in the above-mentioned Patent No. 2,294,942. In brief, oscillator 260′ comprises three cavity resonators 251′, 252′ and 253′. An electron beam is projected under the influence of an accelerating voltage source 269′, successively through these resonators by way of their electron-permeable walls defining gaps across which the electron beam is projected. The electrons of the beam are velocity-modulated on passing through the first gap of resonator 251′ by the oscillating electric field existing at this gap due to oscillations within the resonator 251′. After passing through the field-free drift space 254′, the electrons of the beam are bunched or grouped so that they may then deliver ultra-high-frequency energy to resonator 252′ upon passing through the corresponding gap of this resonator. Resonators 251′ and 252′ are both tuned to a desired ultra-high-frequency f suitable for radiation or transmission. Some of the energy of resonator 252′ is fed back to resonator 251′ by means of the feedback line 255′ to sustain the system in oscillation at this frequency f. Energy at the frequency f may then be extracted from resonator 252′ by means of the coupling line 256. As thus far described, the oscillator 260′ is similar to the Klystron oscillator disclosed in U. S. Patent No. 2,242,275, granted May 20, 1941, to R. H. Varian, and will produce ultra-high-frequency energy of the frequency f in line 256. This energy is supplied to an antenna 264 or to any other load circuit.

In series with the beam-accelerating voltage source 269′ is an oscillator 268 of a frequency which, as will be seen, determines the intermediate frequency of the superheterodyne receiver portion of the system. This oscillator 268 is illustrated as having a frequency $f_a$ such as 15 megacycles per second, but may have any desired value.

As discussed in U. S. Patent No. 2,281,935, granted May 5, 1942, to R. H. Varian and W. W. Hansen, oscillator 268 serves to phase modulate the alternating current component of the grouped electron stream so that the electron beam current represents a phase-modulated wave and will have alternating current components of frequency f and of side frequencies differing from the frequency f by integral multiples of the modulating frequency $f_a$ derived from oscillator 268. Accordingly, by tuning the third resonator 253′ to one of the side frequencies $f \pm nf_a$ of the resulting modulated wave, an output may be derived from coupling line 270 having a frequency separation with respect to the wave in line 256 equal to an integral multiple n of the modulating frequency $f_a$, this multiple corresponding to the order of the side frequency to which resonator 253′ is tuned. If resonator 253′ is sufficiently sharply selective to resonate only at this side frequency and not at the neighboring side frequencies or carrier frequency f, a single-frequency output is derived in line 270 which is separated from the frequency f radiated from antenna 264 by the frequency $f_a$ of oscillator 268 or a desired multiple n thereof. Preferably resonator 253′ is tuned to a higher order side frequency, for example, that corresponding to the second order side band differing from the frequency f by twice the frequency $f_a$ of oscillator 268.

This frequency $f \pm nf_a$ may be further filtered by a filter 271 adapted to pass only this frequency. Filter 271 may assume the form of a hollow cavity resonator resonant at this frequency. Preferably, it would be formed of a resonator, one of whose higher modes of resonance has a resonant frequency equal to this output frequency $f \pm nf_a$, since for such a resonator the selectivity is much higher than for one oscillating at its fundamental or lowest mode. However, filter 271 may be omitted if sufficient selectivity can be obtained from resonator 253′.

The wave radiated by antenna 264 will have a portion of its energy reflected from the distant object to be located, and such reflected energy may be received on a suitable receiving antenna indicated at 274. Antenna 274 is coupled to a mixer 273 of any suitable type, to which is also fed the wave of frequency $f \pm nf_a$ derived from oscillator 260′ and serving as a local oscillator wave in the superheterodyne receiving system. The output of mixer 273 will then be the difference between the two input frequencies, that is $nf_a$, which represents the intermediate frequency of the system.

This intermediate frequency may be utilized in an intermediate frequency circuit 276, one form of which is illustrated in Fig. 22 of the above-mentioned parent application Serial No. 426,986. In this way the intermediate frequency of the receiving system is entirely independent of the frequency f; and, in fact, if the frequency f should change or drift for any reason, it will have no effect upon the intermediate frequency. Accordingly, all of the intermediate frequency circuits may be sharply and fixedly tuned to the frequency $nf_a$ in the illustration used.

It will be noted that the intermediate frequency was chosen as a multiple n of the modulating frequency $f_a$ of oscillator 268 and preferably twice this frequency. In this way any stray coupling between the intermediate frequency circuit 276 and oscillator 268 will be ineffective to produce any harmful results, whereas if the oscillator 260′ produced an output $f \pm f_a$, corresponding to its first side band and resulting in an intermediate frequency of $f_a$, harmful interaction between oscillator 268 and circuit 276 might be encountered unless special precautions in the way of isolation and shielding are used. Such special precautions are unnecessary in the system illustrated in the figure by virtue of the choice of second or higher side band for the local oscillator frequency $f \pm n_a$.

In the device of the present invention the output resonator 253′ need not be tuned to a fixed frequency but may be provided with frequency-adjusting means of any well-known type so that it may be selectively tuned to any of a number of the side frequencies produced. In this way a single device 260′ may produce any of a number of local oscillator frequencies or any of a number of frequency separations from the frequency f, or may provide any of a number of frequency shifts.

Although the modulator of the present invention has been illustrated as operating by varying the accelerating voltage, any other form of modulation may be used to produce the desired side frequencies. Thus, the electron beam current may be varied at the modulating frequency independently of or in conjunction with variation in the accelerating voltage, as by impressing the modulating voltage from oscillator 268 upon a control grid between the cathode and first resonator 251'. Alternatively, the transit time of the electrons may be varied in any of the ways shown in Patent No. 2,281,935. It is to be understood that any form of amplitude, frequency, or phase modulation, or any combination thereof, may be used, including any of those shown in Patent No. 2,281,935.

It will be seen that although the above modifications of the present invention were directed toward a radio locating system having a transmitter and a superheterodyne receiver for receiving reflected energy, in its broader aspect the present invention is concerned with the production of ultra high frequencies with predetermined and fixed frequency separations which are independent of variations in the ultra high frequencies; that is, a plurality of frequencies are produced which "track" with one another. Also, the invention may be used as a frequency shifter or converter.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Ultra high frequency apparatus, comprising means for producing an electron beam, means for velocity modulating said electron beam at a predetermined ultra high frequency, means for extracting energy of said predetermined frequency from said electron stream, means for further controlling said electron stream in accordance with a modulating frequency, and means for further extracting energy from said stream at a frequency differing from said predetermined frequency by an integral multiple of said modulating frequency.

2. Ultra high frequency apparatus, comprising means for producing an electron stream grouped in accordance with a predetermined ultra high frequency wave, means for modulating said electron stream grouping in accordance with a modulating frequency, means for extracting energy of said predetermined frequency from said stream, and further means for extracting energy from said stream of a frequency differing from said predetermined frequency by an integral multiple of said modulating frequency.

3. Ultra high frequency apparatus, comprising an oscillator-buffer velocity modulation electron discharge device having three cavity resonators, the first and second of said resonators being tuned to the same resonant frequency, each of said cavity resonators having a pair of electron permeable walls defining a gap, the gaps of the first and second of said resonators being separated by means defining a field-free drift space, and means including a source of accelerating voltage for projecting a stream of electrons successively through the gap of said first resonator, said drift space, the gap of said second resonator and the gap of said third resonator; means for coupling said first and second resonators together to produce sustained oscillations at the resonant frequency of said resonators, means for extracting energy of substantially said resonant frequency from said second resonator, means for varying the accelerating voltage of said beam in accordance with a modulating frequency, said third resonator being tuned to a frequency differing from said resonant frequency by an integral multiple of said modulating frequency, and means for extracting energy of substantially said latter tuned frequency from said third resonator, whereby two frequencies are produced differing by an integral multiple of said modulating frequency, their difference being independent of variation of said sustained oscillation frequency.

4. High frequency apparatus, comprising means for producing an electron stream, means for producing self-sustained grouping of said electron stream at a predetermined ultra high frequency, means for extracting energy of said frequency from said stream, means for modulating said electron grouping in accordance with a modulating frequency, and means for extracting energy from said stream of a frequency differing from said predetermined frequency by an integral multiple of said modulating frequency.

5. Ultra high frequency apparatus, comprising means for producing an electron stream, means for producing self-sustained grouping of the electrons of said stream at a predetermined frequency, means for controlling said stream at a modulating frequency, and means for extracting ultra high frequency energy from said stream at a frequency differing from said predetermined frequency by an integral multiple of said modulating frequency.

6. Apparatus as in claim 5, further including means for extracting energy of said predetermined frequency, means for radiating said extracted energy of predetermined frequency, means for receiving a portion of said radiated energy, and means for mixing said received energy and said different frequency extracted energy to produce an intermediate frequency of an integral multiple of said modulating frequency and independent of variation of said predetermined frequency.

*7. Ultra high frequency apparatus, including a velocity modulation electron discharge device having an input resonator and an output resonator, the input resonator being resonant at a carrier signal frequency and the output resonator being resonant at a sideband signal frequency, means for producing an electron beam directed through said input and output resonators in succession, means for modulating said beam at an intermediate frequency one of whose harmonics, including the first, is substantially equal to the difference between said carrier frequency and said sideband frequency, means for extracting energy of said sideband frequency from said output resonator, means for receiving ultra high frequency energy, and means for mixing said received energy and said extracted energy of said second frequency to produce energy of an intermediate frequency therebetween.*

*8. A frequency converter system comprising a velocity modulation electron discharge device having at least two resonators, means for introducing a carrier frequency signal into a first one of said resonators, the second of said two resonators being resonant at a second frequency different from said carrier signal frequency by an intermediate radio frequency less than said carrier frequency, and means for providing an electron beam projected through said first and second resonators in turn and modulating said beam at*

*a frequency substantially equal to said intermediate frequency, for providing output energy at said second frequency in said second resonator.*

THE SPERRY CORPORATION,
*Assignee of William W. Hansen, Deceased,*
By WILLIAM C. HORNCASTLE,
*Assistant Secretary.*
JOHN R. WOODYARD.

REFERENCES CITED

The following references are of record in the file of this patent or the original patent:

UNITED STATES PATENTS

| Number | Name | Date |
|---|---|---|
| Re. 21,955 | Chaffee | Nov. 25, 1941 |
| 1,993,395 | Beers | Mar. 5, 1935 |
| 2,143,864 | Conklin et al. | Jan. 17, 1939 |
| 2,189,549 | Hershberger | Feb. 6, 1940 |
| 2,268,643 | Crosby | Jan. 6, 1942 |
| 2,281,935 | Hansen et al. | May 5, 1942 |
| 2,318,106 | Ryan | May 4, 1943 |